(12) United States Patent  
Uro (10) Patent No.: US 12,264,052 B2
(45) Date of Patent: Apr. 1, 2025

(54) REMOTE CONTROL SYSTEM (71) Applicant: Mitsubishi Logisnext Co., Ltd., Kyoto (JP)

(72) Inventor: Akira Uro, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 194 days.

(21) Appl. No.: 17/702,747

(22) Filed: Mar. 23, 2022

(65) Prior Publication Data

US 2023/0106964 A1 Apr. 6, 2023

(30) Foreign Application Priority Data

Oct. 5, 2021 (JP) .................................. 2021-163952

(51) Int. Cl.
*B66F 9/075* (2006.01)
*H04N 7/18* (2006.01)

(52) U.S. Cl.
CPC ........ *B66F 9/07581* (2013.01); *B66F 9/0755* (2013.01); *H04N 7/185* (2013.01)

(58) Field of Classification Search
CPC ............................. B66F 9/07581; H04N 7/185
See application file for complete search history.

(56) References Cited

U.S. PATENT DOCUMENTS

| | | | | |
|---|---|---|---|---|
| 2015/0226561 | A1* | 8/2015 | Chandrasekar | B60R 21/00 701/1 |
| 2018/0059682 | A1* | 3/2018 | Thode | B66F 17/003 |
| 2018/0238696 | A1* | 8/2018 | Takeda | G08G 1/16 |
| 2019/0077458 | A1* | 3/2019 | Khlifi | B62D 15/025 |
| 2019/0119087 | A1 | 4/2019 | Fischbach et al. | |
| 2019/0294181 | A1 | 9/2019 | Ohno et al. | |
| 2020/0318986 | A1* | 10/2020 | Nara | G01C 21/3484 |

FOREIGN PATENT DOCUMENTS

| | | | |
|---|---|---|---|
| JP | 2014011518 | | 1/2014 |
| JP | 2021022802 | | 2/2021 |
| JP | 2021022802 | A * | 2/2021 |
| JP | 6898054 | | 7/2021 |
| WO | 2014091611 | | 6/2014 |
| WO | 2020170747 | | 8/2020 |

(Continued)

OTHER PUBLICATIONS

English Translation of JP 2021022802 (Year: 2021).*

(Continued)

*Primary Examiner* — Anshul Sood
(74) *Attorney, Agent, or Firm* — JCIPRNET (57) ABSTRACT

A remote control system allows a forklift to be operated remotely in an intuitive and easy way even when an obstacle is present between the forklift and the object. The remote control system includes a guidance route display section that displays on a display unit a guidance route connecting the forklift and the object. The guidance route display section is configured to display a guidance route straightly connecting the forklift and the object if a judgement section judges that an obstacle is not present, or, if the judgement section judges that an obstacle is present, display a guidance route connecting the forklift and the object in a manner of avoiding the obstacle.

5 Claims, 10 Drawing Sheets

(56) References Cited

FOREIGN PATENT DOCUMENTS

WO    WO-2020170747 A1 *  8/2020

OTHER PUBLICATIONS

English Translation of WO 2020170747 (Year: 2020).*
"Search Report of Europe Counterpart Application", issued on Sep. 14, 2022, pp. 1-7.
"Office Action of China Counterpart Application", issued on Nov. 29, 2024, with English translation thereof, p. 1-p. 16.
"Decision of Rejection of China Counterpart Application", with English translation thereof, issued on Feb. 14, 2025, pp. 1-20.

* cited by examiner

REMOTE CONTROL SYSTEM

CROSS-REFERENCE TO RELATED APPLICATION

This application claims the priority benefits of Japanese Patent Application No. 2021-163952, filed on Oct. 5, 2021. The entirety of the above-mentioned patent application is hereby incorporated by reference herein and made a part of this specification.

FIELD OF THE INVENTION

This invention relates to a remote control system for remotely operating a forklift.

DESCRIPTION OF RELATED ART

A forklift is for an operator to board and perform operations of carrying and unloading a cargo. Hence, many years of experience are required for the operator to operate the forklift quickly and accurately. On the other hand, since the number of skilled operators is limited, the number of skilled operators may be insufficient in a locality with a small population. Hence, it is required that a skilled operator remotely operate a local forklift from an area where there are many skilled operators.

Further, when handling a tank filled with a gas that adversely affects the human body or an explosive that explodes if dropped, it is preferred that the operator operates the forklift remotely away from the warehouse where the cargo is handled.

Therefore, a remote control system for remotely operating a forklift is known (see, for example, Patent Literature 1). In the remote control system, an operation apparatus is provided in a remote base station away from the warehouse where the cargo is handled by the forklift, and the operator operates the forklift from the remote base station using the operation apparatus.

The forklift has a control device, a wireless communication device, a camera, a sensor, and a driving device for operating its traveling and the raising/lowering of its fork, etc. The operation apparatus in the base station includes a handle, a lever, a pedal, a control unit and a display unit, etc. For example, the display unit is provided with two display monitors, one of which displays an image of the front of the forklift taken by a camera mounted on the forklift, and the other of which displays the information detected by the sensor and so on.

When carrying and unloading with a forklift, the operator operates the forklift using the handle or the lever, etc., while checking the object to be handled in front of the forklift based on the image on the display unit. On the other hand, depending on the direction of the forklift, the object to be handled may not be visible from the display unit, so that there is a problem that operating the forklift is difficult. Further, if there is an obstacle between the forklift and the object, operating the forklift is also difficult, as it is required to approach the object in a manner of avoiding the obstacle while checking the positions of both the object and the obstacle.

CITATION LIST

Patent Literature

Patent Literature 1: Japanese Patent Laid-Open No. 2014-11518 (JP2014011518A)

SUMMARY OF THE INVENTION

Accordingly, this invention provides a remote control system that allows a forklift to be operated intuitively and easily even if an obstacle is present between the forklift and the object, while the forklift is operated remotely.

The remote control system is for remotely operating a forklift, and includes a camera provided on the forklift, a display unit displaying images taken by the camera, a forklift coordinates acquisition section acquiring the coordinates of the forklift, an object coordinates acquisition acquiring the coordinates of a designated object, a judgement section judging whether or not an obstacle is present between the forklift and the object, and a guidance route display section displaying a guidance route connecting the forklift and the object on the display unit. The guidance route display section is configured to display a guidance route straightly connecting the forklift and the object if the judgement section judges that the obstacle is not present between the forklift and the object, or display a guidance route connecting the forklift and the object in a manner of avoiding the obstacle if the judgement section judges that the obstacle is present between the forklift and the object.

In an embodiment, the judgement section forms a virtual route straightly connecting the forklift and the object and having a width corresponding to the width of the forklift, and judges that the obstacle is not present between the forklift and the object if the entirety or a portion of the obstacle is not present inside the virtual route, or that the obstacle is present between the forklift and the object if the entirety or a portion of the obstacle is present inside the virtual route, and the guidance route display section displays the guidance route in a manner that the entirety or a portion of the obstacle is not present inside the guidance route.

In an embodiment, the guidance route display section displays the guidance route having a width corresponding to the width of the forklift.

In an embodiment, the guidance route display section displays first and second guidance routes as the above guidance route, wherein the first guidance route avoids the right side of the obstacle and the second guidance route avoids the left side of the obstacle.

In an embodiment, the first guidance route and the second guidance route have different colors, shapes or blink rates With the remote control system of his invention, while the forklift is operated remotely, the forklift can be operated intuitively and easily even if an obstacle is present between the forklift and the object.

DESCRIPTION OF THE EMBODIMENTS

The remote control system according to an embodiment of this invention is described below with reference to the drawings.

[Remote Control System]

Figure 1:
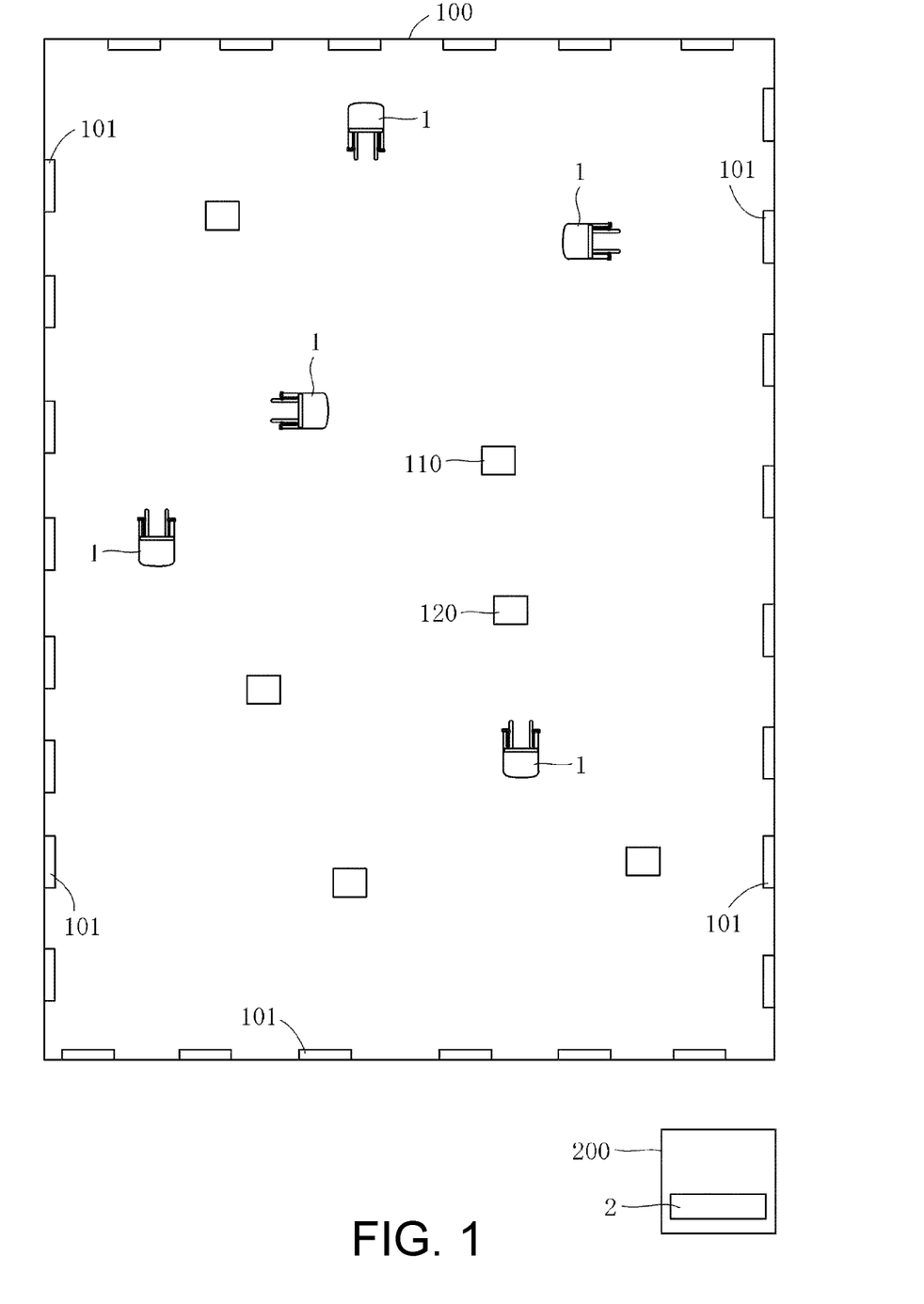
FIG. 1 schematically illustrates a plan view of a remote control system according to an embodiment of this invention.

Referring to FIG. 1, the remote control system includes forklifts 1 that travel and do cargo handling work in the facility 100. The remote control system is provided with a base station 200 provided at a remote location away from the facility 100. The base station 200 is provided with an operation apparatus 2. An operator can remotely operate a predetermined forklift 1 by using the operation apparatus 2.

Although the facility 100 is a warehouse in this embodiment, the facility in this invention may alternatively be a factory or an outdoor work place, etc. In addition, though the forklifts 1 are reach forklifts in this embodiment, they may be counterbalance forklifts or the like alternatively. When an operator operates a forklift 1 from a remote base station 200, for example, a tank filled with a gas that adversely affects the human body or an explosive that explodes if dropped can be loaded and unloaded in the facility 100.

[Forklift]

Figure 2:
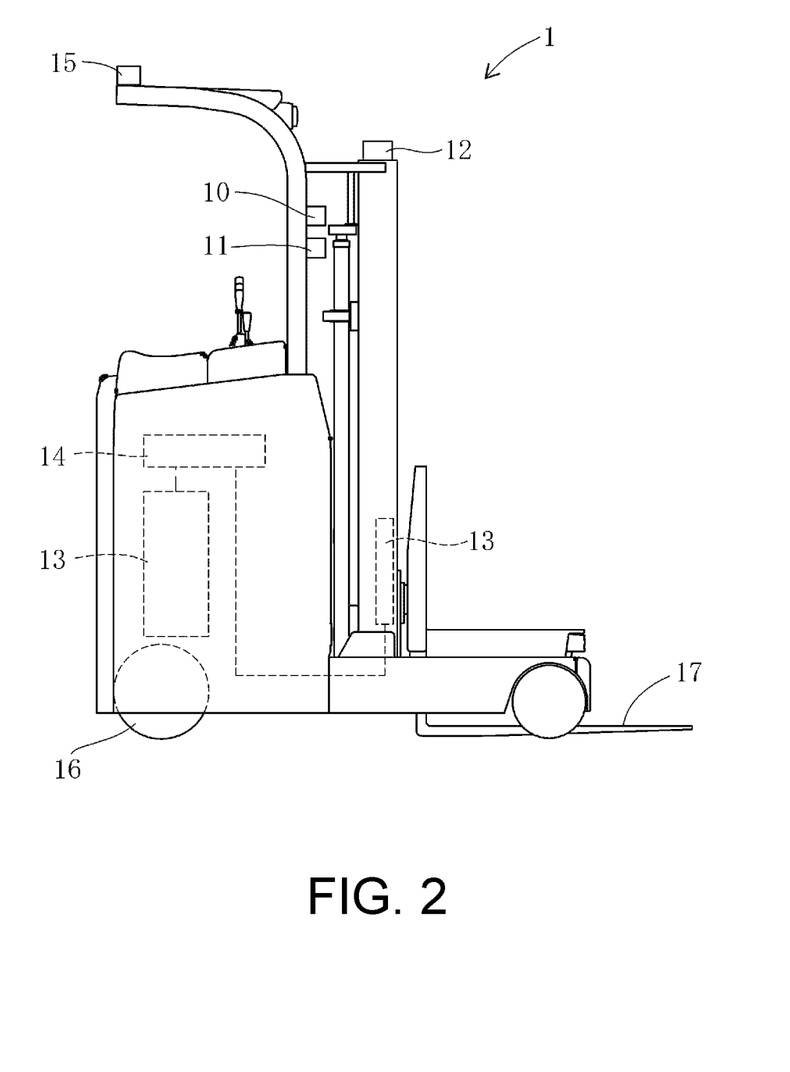
FIG. 2 schematically illustrates a side of a forklift used in the embodiment.
Figure 3:
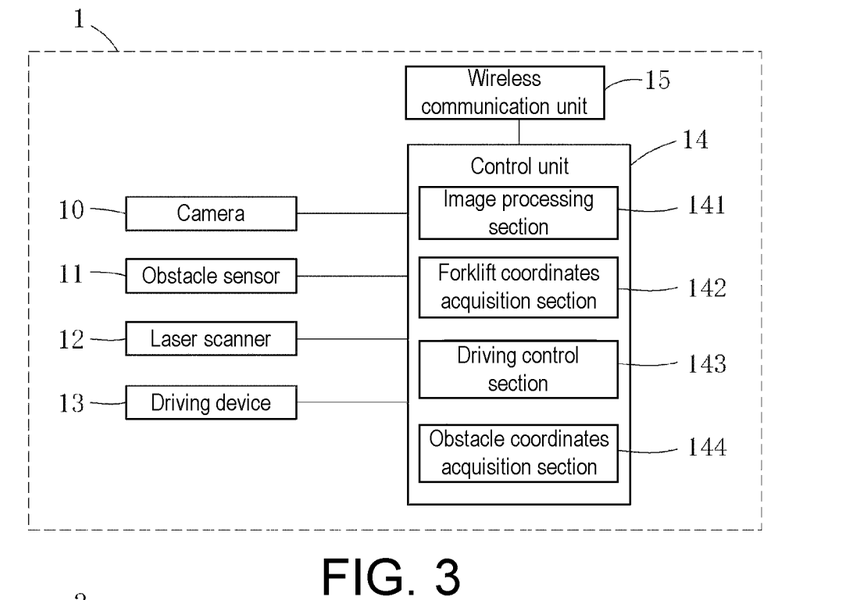
FIG. 3 is a block diagram showing the configuration of the forklift.

Referring to FIG. 2, the forklift 1 includes a camera 10, an obstacle sensor 11, a laser scanner 12, a driving device 13, a control unit 14, and a wireless communication unit 15, etc. Referring to FIG. 3, the control unit 14 includes an image processing section 141, a forklift coordinates acquisition section 142, a driving control section 143 and an obstacle coordinates acquisition section 144, etc. The control unit 14 is composed of a CPU (as a central processing device), an input/output interface, ROM and RAM, etc., and stores a program for processing information. The camera 10, the obstacle sensor 11, the laser scanner 12, the driving device 13 and the wireless communication unit 15 are connected to the control unit 14.

The driving device 13 includes a traveling motor for driving the driving wheels 16 provided at the rear part of the body of the forklift 1, a plurality of hydraulic cylinders for raising, lowering, tilting, advancing and retreating the fork 17 provided at the front part of the body of the forklift 1, and so on. An operation signal from the operation apparatus 2 provided in the base station 200 is sent to the control unit 14 via the wireless communication unit 15, this operation signal is processed by the driving control section 143, and the driving device 13 of the traveling motor and the hydraulic cylinders is driven based on the operation of the operation apparatus 2. As a result, the driving device 13 of the traveling motor, the hydraulic cylinders and so on is driven in conjunction with the operation of the operation apparatus 2 by the operator, and the forklift 1 can be operated.

The camera 10 is arranged at a position of the line of sight of an operator who operates on board the forklift 1, and takes pictures of the front of the forklift 1 from the position of the line of sight of such operator. The camera 10 includes, for example, a CCD image sensor or a CMOS image sensor. The image taken by the camera 10 is processed by the image processing section 141 of the control unit 14 and displayed on the display unit 20 (FIG. 4) provided in the operation apparatus 2. Thereby, the operator who remotely controls the forklift 1 using the operating apparatus 2 at the base station 200 is able to confirm, by means of the display unit 20, the front of the forklift 1 from the same line of sight as when he or she is on board the forklift 1 to operate the forklift 1.

The forklift 1 is provided with a laser scanner 12, and a plurality of reflectors 101 are installed in the facility 100. The laser scanner 12 transmits/receives laser to/from the reflectors 101 while rotating the laser horizontally by 360°. As a result, the forklift 1 can recognize the plurality of reflectors 101 arranged along the traveling path in the facility 100 using the laser scanner 12. Here, the reflectors 101 are fixed to the walls in the facility 100, and their position information stored in the map of the forklift coordinates acquisition section 142 of the control unit 14. With the recognition of the plurality of reflectors 101 by the forklift 1 using the laser scanner 12, the forklift coordinates acquisition section 142 can measure and acquire the position coordinates of the forklift 1 based on the principle of triangulation.

The forklift 1 is provided with an obstacle sensor 11, which includes, for example, an optical sensor. The obstacle sensor 11 is capable of detecting an obstacle present in a predetermined area in front of the forklift 1 and also measure the distance and the direction from the forklift 1 to the obstacle. The obstacle coordinates acquisition section 144 of the control unit 14 can measure and acquire the position coordinates of the obstacle based on the detection signals of the obstacle sensor 11 and the position coordinates of the forklift 1.

[Operating Apparatus]

Figure 4:
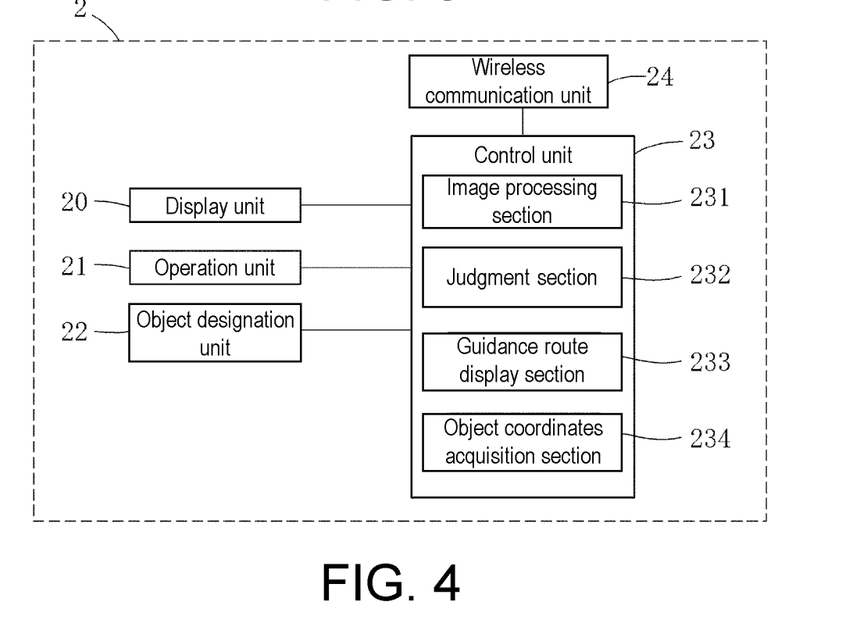
FIG. 4 is a block diagram showing the configuration of the operating apparatus used in the embodiment.

Referring to FIG. 4, the operation apparatus 2 includes a display unit 20, an operation unit 21, an object designation unit 22, a control unit 23, and a wireless communication unit 24, etc. The control unit 23 includes an image processing section 231, a judgement section 232, a guidance route display section 233, and an object coordinates acquisition section 234, etc. The control unit 23 is composed of a CPU (a central processing device), an input/output interface, ROM, RAM and so on, and stores a program for processing information. The display unit 20, the operation unit 21, the object designation unit 22 and the wireless communication unit 24 are connected to the control unit 23.

The display unit 20 may include, for example, two display monitors, wherein one display monitor displays an image of the front of the forklift 1 taken by the camera 10 mounted on the forklift 1, and the other display monitor displays information detected by various sensors and information necessary for operation, etc.

The operation unit 21 includes a handle, a lever and a pedal, etc., and the operator can operate the forklift in the same manner as when actually boarding the forklift and operating. The operation signal from the operation unit 21 is transmitted by the wireless communication unit 24 via the control unit 23 and received by the wireless communication unit 15 of the forklift 1, Then, the operator can remotely operate the driving device 13 and so on of the forklift 1, as described above, by operating the handle, the lever and so on of the operation unit 21.

The object designation unit 22 is, for example, a mouse. As described later, after the operator uses the mouse as the object designating unit 22 to designate an object 110 with the pointer 220 displayed on the display unit 20, the guidance route display section 233 displays, on the display unit 20, a guidance route GR or guidance routes GR1 and GR2 connecting the designated object 110 and the forklift 1 (FIGS.

Figure 6:
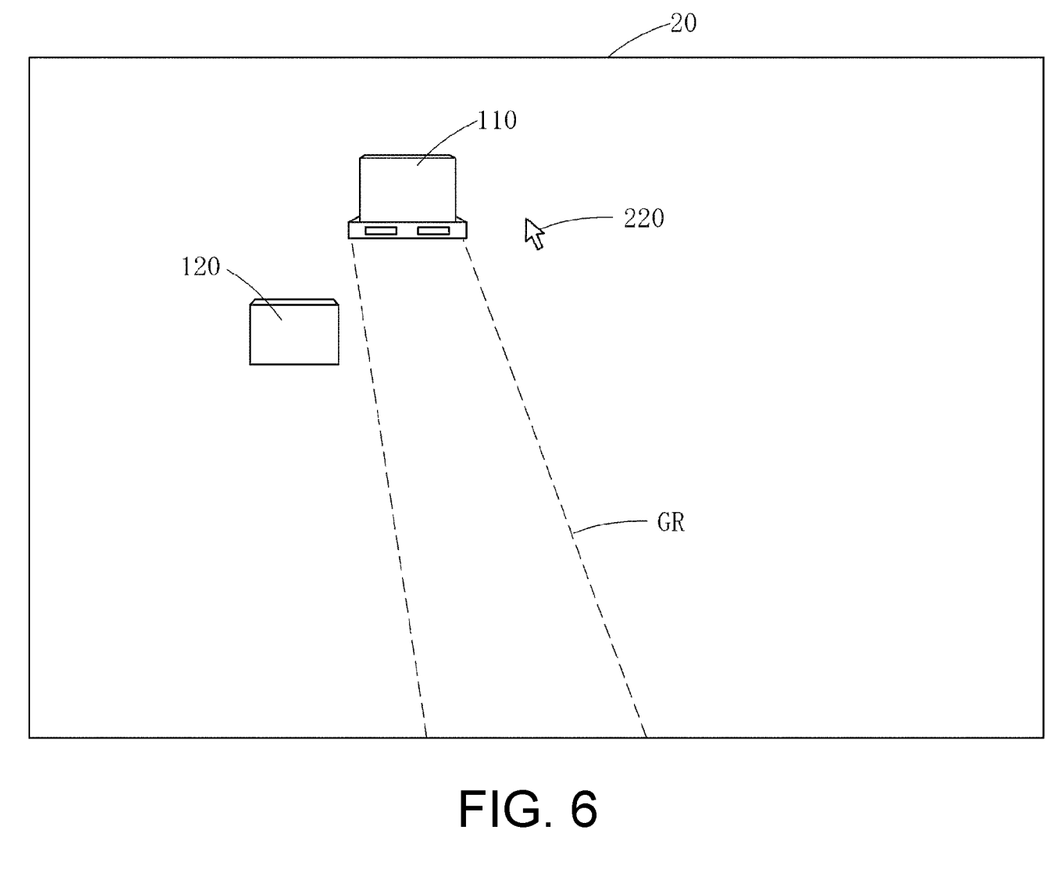
FIG. 6 depicts a display unit on which a straight guidance route is displayed in the embodiment.
Figure 8:
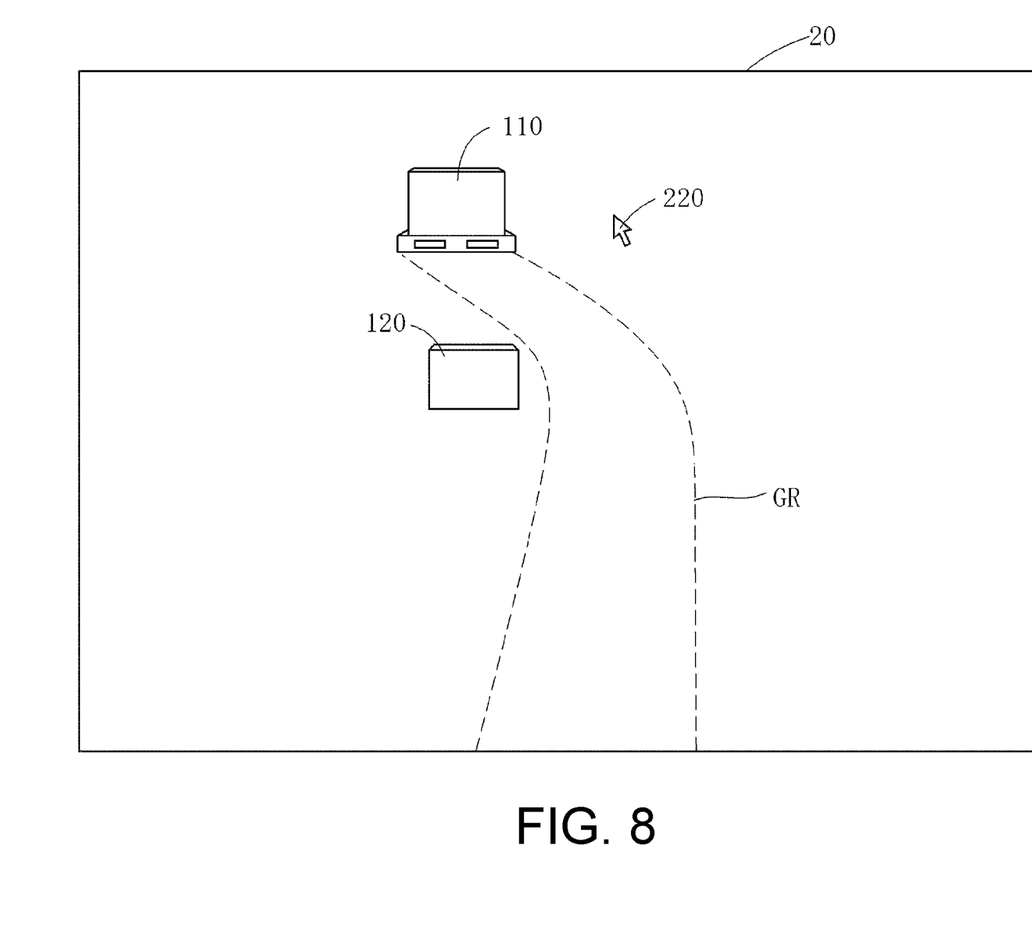
FIG. 8 depicts a display unit on which a curved guidance route is displayed in the embodiment.
Figure 10:
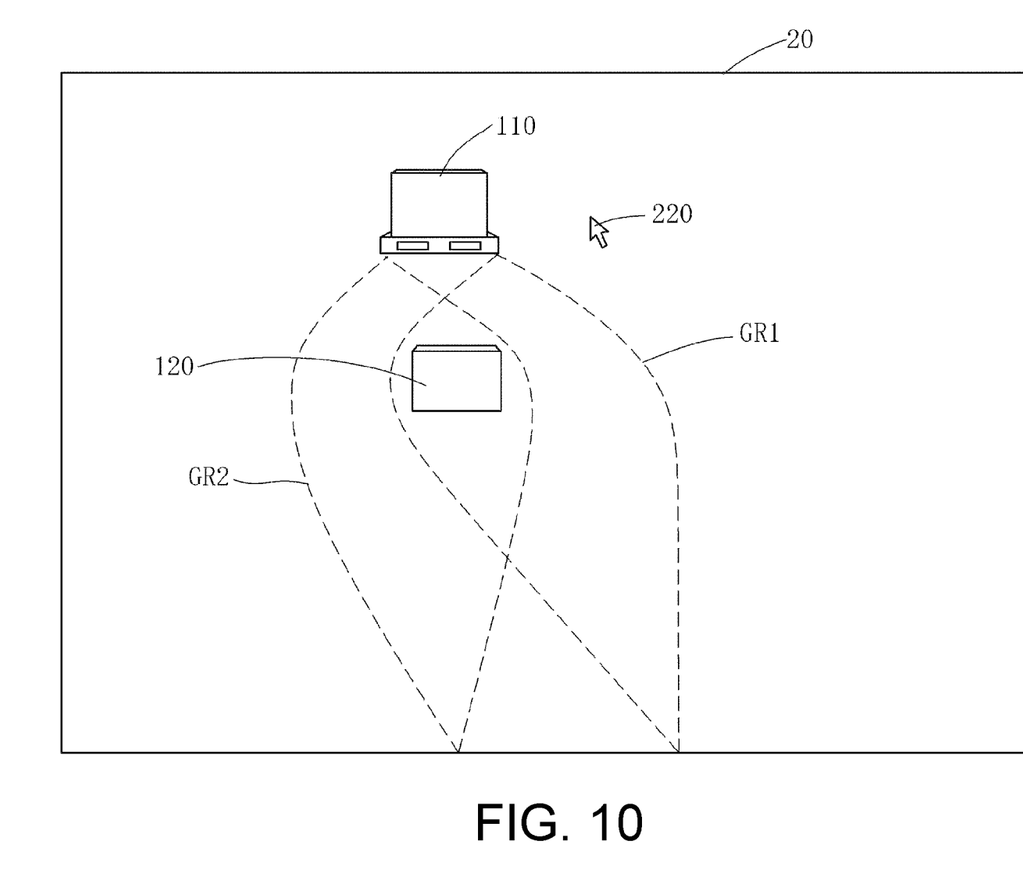
FIG. 10 depicts a display unit on which first and second guidance routes are displayed.

6, 8 and 10). When the forklift 1 travels to the object 110, the operator can virtually travel along the guidance route GR, GR1 or GR2 displayed on the display unit 20, so that the forklift 1 can be operated intuitively and easily.

First Embodiment

The first embodiment of the remote control system will be described below.

Figure 5:
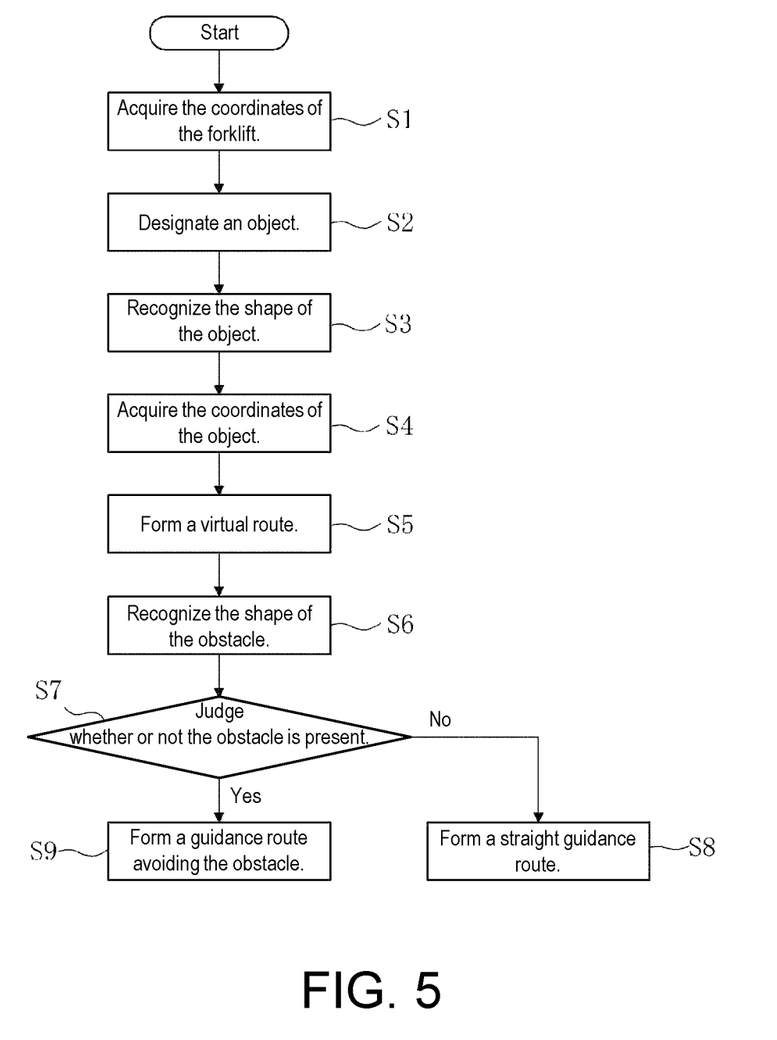
FIG. 5 is a flowchart showing a control flow of the remote control system according to the embodiment.

Referring to FIG. 5, the forklift coordinates acquisition section 142 constantly measures and acquires the absolute coordinates (Fx, Fy) of the forklift 1 (step S1). An image taken by the camera 10 is always displayed on the display unit 20. The operator remotely controls the forklift 1 by the operation unit 21 based on the image displayed on the display unit 20.

Referring to FIG. 6, after the objects 110 to be handled is displayed on the display unit 20, the operator uses the mouse as the object designation unit 22 and the pointer 220 displayed on the display unit 20 to designate an object 110 (step S2). Specifically, after the operator puts the pointer 220 on the object 110 and clicks the mouse, the object 110 is designated.

The image processing section 231 identifies the boundary with the floor surface, the wall surface or the like to recognize the shape of the designated object 110 (step S3). Then, the object coordinates acquisition section 234 acquires the camera coordinates of the object 110 displayed on the display unit 20, and the absolute coordinates (Ox, Oy) of the object 110 are measured and acquired based on the absolute coordinates (Fx, Fy) of the forklift 1 (step S4).

Figure 7:
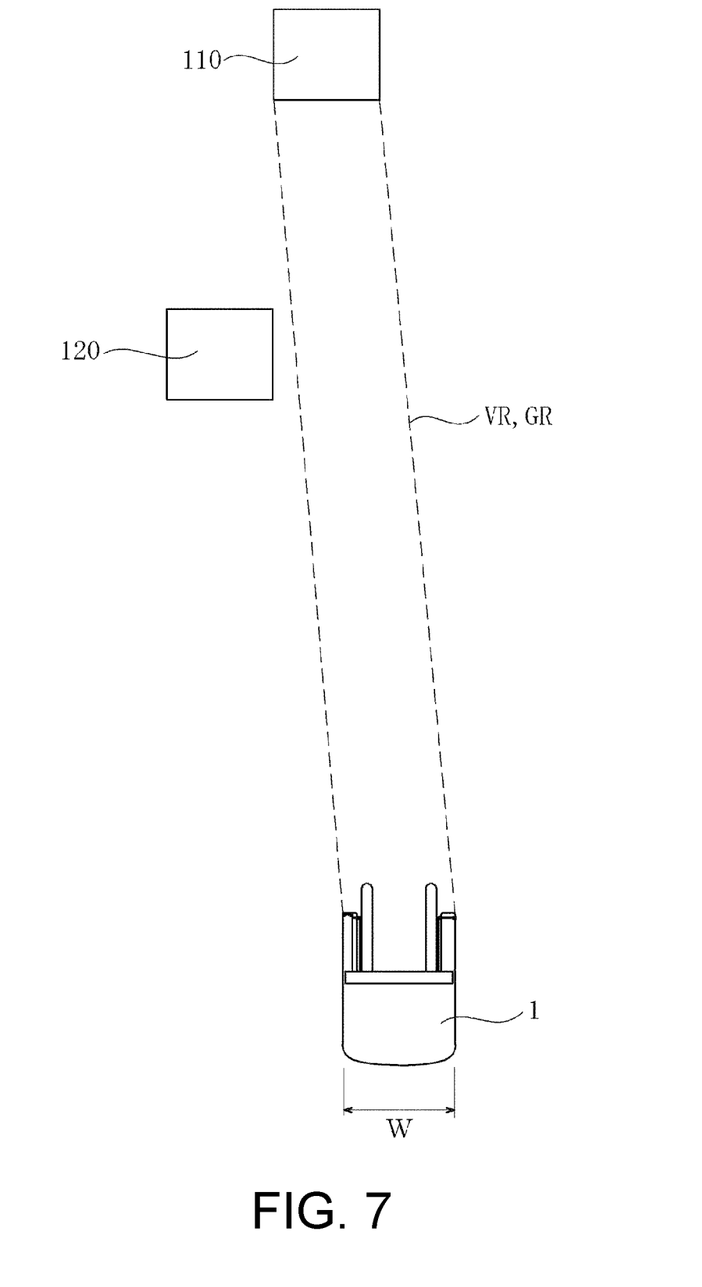
FIG. 7 illustrates a plan view for explaining the straight guidance route.

Referring to FIG. 7, the judgement section 232 connects the absolute coordinates (Fx, Fy) of the forklift 1 and the absolute coordinates (Ox, Oy) of the object 110 to form a virtual route VR having a width corresponding to the width W of the forklift 1 (step S5). Then, the obstacle sensor 11 measures and acquires the coordinate position of the obstacle 120, and the image processing section 231 identifies the boundary with the floor surface, the wall surface or the like, so that the shape of the obstacle 120 existing other than the object 110 is recognized (step S6). After that, the judgement section 232 judges whether or not the obstacle 120 is present between the forklift 1 and the object 110 (step S7). The presence or absence of the obstacle 120 is judged as follows.

The judgement section 232 judges that the obstacle 120 is not present between the forklift 1 and the object 110 if the entirety or a portion of the obstacle 120 is not present inside the formed virtual route VR (step S7). Because a travel route having a width corresponding to the width W of the forklift 1 is formed when the forklift 1 actually travels, with the virtual route VR having the width W, the actual travel route of the forklift 1 can be conceived virtually and intuitively.

Referring to FIGS. 6 and 7, if the judgement section 232 judges that the obstacle 120 is not present between the forklift 1 and the object 110, a guidance route GR straightly connecting the forklift 1 and the object 110 is formed (step S8). The guidance route GR has a width corresponding to the width W of the forklift 1, so that if it is judged that the obstacle 120 is not present, the guidance route GR coincides with the virtual route YR. Because a travel route having a width corresponding to the width W of the forklift 1 is formed when the forklift 1 actually travels, with the guidance route GR having the width W, the actual travel route of the forklift 1 can be conceived virtually and intuitively.

Referring shown in FIG. 6, the guidance route display section 233 converts the formed guidance route GR into camera coordinates and displays it on the display unit 20. Then, as the forklift 1 moves, the absolute coordinates (Fx, Fy) of the forklift 1 are changed, and the guidance route GR is displayed on the display unit 20 following the absolute coordinates (Fx, Fy) of the forklift 1 that are changed at any time.

Figure 9:
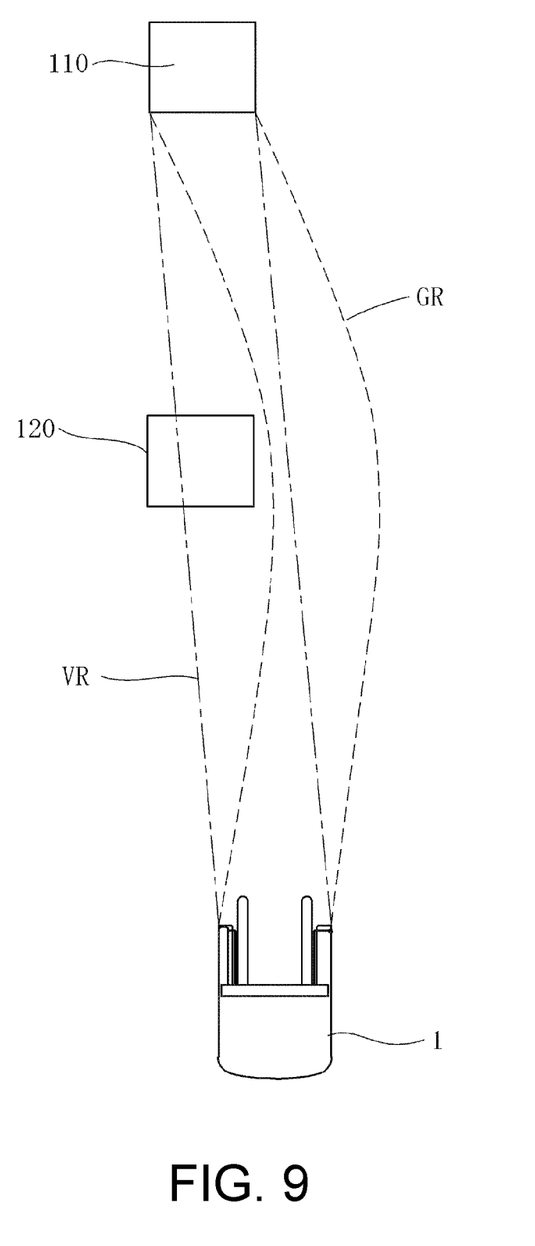
FIG. 9 illustrates a plan for explaining the curved guidance route.

On the other hand, the judgement section 232 judges that the obstacle 120 is present between the forklift 1 and the object 110 if the entirety or a portion of the obstacle 120 is present inside the formed virtual route VR (step S7). If the judgement section 232 judges that the obstacle 120 is present, then the guidance route GR connecting the forklift 1 and the object 110 is formed in a manner of avoiding the obstacle 120 (step S9). Referring to FIGS. 8 and 9, the guidance route GR has a width corresponding to the width W of the forklift 1, and is formed by curves not overlapping with the recognized obstacle 120. For example, a guidance route GR can be formed by connecting both end points of the forklift 1 with points separated from the obstacle 120 by predetermined distances and both end points of the object 110 by spline curves.

Referring to FIG. 8, the guidance route display section 233 converts the formed guidance route GR into camera coordinates and displays it on the display unit 20. Then, as the forklift 1 moves, the absolute coordinates (Fx, Fy) of the forklift 1 are changed, and the guidance route is displayed on the display unit 20 following the absolute coordinates (Fx, Fy) of the forklift 1 that are changed at any time.

Second Embodiment

A second embodiment of the remote control system will be described below. For the same configuration as the first embodiment, detailed description thereof is omitted to avoid duplicate explanations.

Referring to FIG. 5, the forklift coordinates acquisition section 142 constantly measures and acquires the absolute coordinates (Fx, Fy) of the forklift 1 (step S1). Then, the operator designates an object 110 by the object designation unit 22 (step S2).

The image processing section 231 recognizes the shape of the designated object 110 (step S3), Then, the object coordinates acquisition section 234 measures and acquires the absolute coordinates (Ox, Oy) of the object 110 (step S4).

The judgement section 232 forms a virtual route VR connecting the absolute coordinates (Fx, Fy) of the forklift 1 and the absolute coordinates (Ox, Oy) of the object 110 (step S5). Then, the image processing section 231 recognizes the shape of the obstacle 120 (step S6). After that, the judgement section 232 judges whether or not the obstacle 120 is present between the forklift 1 and the object 110 (step S7). If the judgement section 232 judges that the obstacle 120 is not present, a guidance route GR straightly connecting the forklift 1 and the object 110 is formed as in the first embodiment (step S8).

Figure 11:
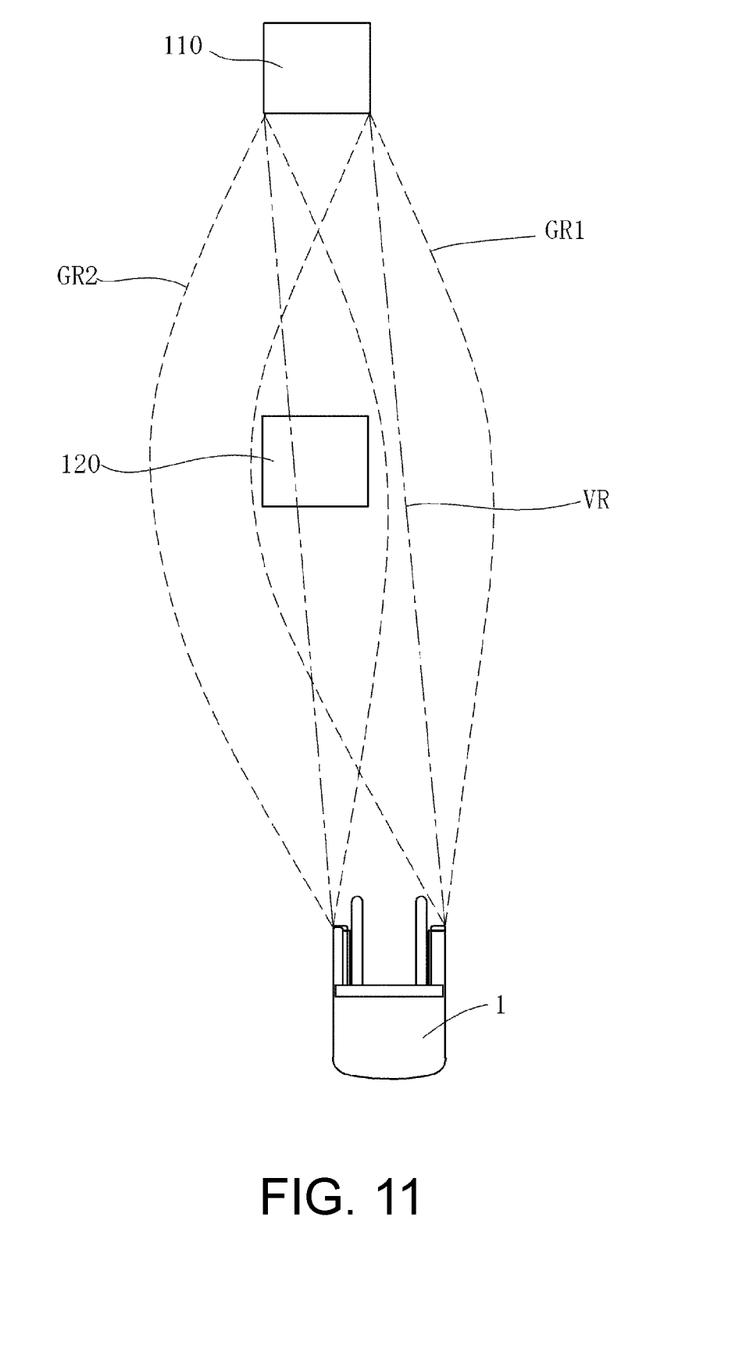
FIG. 11 illustrates a plan view for explaining the first and second guidance routes.

On the other hand, if the judgement section 232 judges that the obstacle 120 is present, a curved guidance route GR connecting the forklift 1 and the object 110 is formed in a manner of avoiding the obstacle 120 (step S9). In the second embodiment, as shown in FIG. 11, two guidance routes are formed at this time, including a first guidance route GR1 avoiding the right side of the obstacle 120, and a second guidance route GR2 avoiding the left side of the obstacle 120. As a result, the operator can intuitively determine to drive on the right side or the left side of the obstacle 120 while checking the conditions of the road surface and the surroundings and so on.

Referring to FIG. 10, the guidance route display section 233 converts the formed first and second guidance routes GR1 and GR2 into camera coordinates and displays them on the display unit 20. Then, as the forklift 1 moves, the absolute coordinates (Fx, Fy) of the forklift 1 are changed, and the first and second guidance routes GR1 and GR2 are displayed on the display unit 20 following the absolute coordinates (Fx, Fy) of the forklift 1 that are changed at any time. The first and second guidance routes GR1 and GR2 are displayed in different colors, shapes or blink rates to allow the operator to easily recognize each of the guidance routes GR1 and GR2.

Although the preferred embodiments of this invention have been described above, the configuration of this invention is not limited to them. For example, the configuration may be modified as follows.

- Though the obstacle sensor 11 is an optical sensor in the above embodiments, for example, an obstacle 120 other than the object 110 also may be recognized by the image processing section 141 based on the image taken by the camera 10, so the obstacle sensor 11 also can be constituted of the image processing section 141.
- Though the guidance route GR has a band shape having a width corresponding to the width W of the forklift 1 in the above embodiments, it also may be represented by an arrow, a blinking line or a thin line, etc.
- Though the guidance route GR is formed by curved lines to avoid the obstacle 120 in the above embodiments, it also may be formed by a bent line or the like.
- Though the object designation unit 22 is a mouse in the above embodiments, if, for example, the display monitor 20 is a touch panel, then the operator may press an object 110 displayed on the display monitor 20 with a finger to designate the object 110, and thus the object designation unit 22 also may be constituted of a touch sensor.

Effects of this invention are described below.

The remote control system according to this invention includes a camera 10 provided on the forklift 1, a display unit 20 displaying the images taken by the camera 10, and a forklift coordinates acquisition section 142 acquiring the coordinates of the forklift 1. Further, the remote control system designates an object 110 displayed on the display unit 20, and also includes an object coordinates acquisition section 234 acquiring the coordinates of the object 110, a judgement section 232 judging whether or not the obstacle 120 is present between the forklift 1 and the object 110, and a guidance route display section 233 displaying on the display unit 20 a guidance route GR connecting the forklift 1 and the object 110. The guidance route display section 233 is configured to display a guidance route GR straightly connecting the forklift 1 and the object 110 if the judgement section 232 judges that the obstacle 120 is not present between the forklift 1 and the object 110, or display a guidance route GR connecting the forklift 1 and the object 110 in a manner of avoiding the obstacle 120 if the judgement section 232 judges that the obstacle 120 is present between the forklift 1 and the object 110.

As described above, even when the obstacle 120 is present between the forklift 1 and the object 110, a guidance route GR connecting the forklift 1 and the object 110 in a manner of avoiding the obstacle 120 is displayed on the display unit 20. As a result, n the forklift 1 travels to the object 110, the operator virtually travel along the guidance route GR displayed on the display unit 20, so that the forklift 1 can be operated intuitively and easily.

It is preferred that the judgement section 232 connects the forklift 1 and the object 110 to form a virtual route YR having a width corresponding to the width W of the forklift 1 and then judges that the obstacle 120 is not present if the entirety or a portion of the obstacle 120 is not present inside the virtual route VR, or judges that the obstacle 120 is present if the entirety or a portion of the obstacle 120 is present inside the virtual route VR, and the guidance route display section 233 displays the guidance route GR in a manner that the entirety or a portion of the obstacle 120 is not present inside the guidance route GR.

Because a travel route having a width corresponding to the width W of the forklift 1 is formed when the forklift 1 actually travels, with the virtual route VR having the width W, an actual travel route of the forklift 1 can be conceived virtually and intuitively.

Further, it is desirable that the guidance route display section 233 displays the guidance route GR having a width corresponding to the width W of the forklift 1.

When the forklift 1 actually travels, a travel route having a width corresponding to the width W of the forklift 1 is formed. Since the guidance route GR has a width W, the operator can virtually and intuitively conceive an actual travel route of the forklift 1, so that the forklift 1 can easily travel.

Furthermore, it is preferred that the guidance route display section 233 displays a first guidance route GR1 that avoids the right side of the obstacle 120 and a second guidance route GR2 that avoids the left side of the obstacle 120.

The operator can intuitively determine to drive on the right side or the left side of the obstacle 120 according to the conditions of the road surface and the surroundings, and so on.

The first and second guidance routes GR1 and GR2 have different colors, shapes, or blink rates. As a result, the operator can easily recognize each of the guidance routes GR1 and GR2.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

The invention claimed is:

1. A remote control system for remotely operating a forklift, comprising:
   a camera, provided on the forklift;
   a display, displaying images taken by the camera;
   a processor configured to function as:
   a forklift coordinates acquisition section, acquiring coordinates of the forklift;
   an object coordinates acquisition section, acquiring coordinates of a designated object;
   a judgement section, judging whether or not an obstacle is present between the forklift and the object; and
   a guidance route display section, configured to display on the display unit a guidance route straightly connecting the forklift and the object if the judgement section judges that the obstacle is not present between the forklift and the object, or display on the display unit a guidance route connecting the forklift and the object in a manner of avoiding the obstacle if the judgement section judges that the obstacle is present between the forklift and the object, wherein the guidance route display section displays first and second guidance routes as the guidance route, wherein the first guidance route avoids a right side of the obstacle and the second guidance route avoids a left side of the obstacle, wherein the first guidance route and the second guidance route have different blink rates, wherein the judgement section forms a straight virtual route straightly connecting the forklift and the object and having a width corresponding to a width of the forklift, and judges that the obstacle is present between the forklift and the object if the entirety or a portion of the obstacle is present inside the straight virtual route having the width corresponding to the width of the forklift.

2. The remote control system of claim 1, wherein
the judgement section judges
that the obstacle is not present between the forklift and the object if an entirety or a portion of the obstacle is not present inside the virtual route,
the guidance route display section displays the guidance route in a manner that that entirety or a portion of the obstacle is not present inside the guidance route.

3. The remote control system of claim 2, wherein the guidance route display section displays the guidance route having a width corresponding to the width of the forklift.

4. The remote control system of claim 1, wherein the guidance route display section displays the guidance route having a width corresponding to a width of the forklift.

5. A remote control system for remotely operating a forklift, comprising:
a camera, provided on the forklift;
a display, displaying images taken by the camera;
a processor configured to function as:
a forklift coordinates acquisition section, acquiring coordinates of the forklift;
an object coordinates acquisition section, acquiring coordinates of a designated object;
a judgement section, judging whether or not an obstacle is present between the forklift and the object; and
a guidance route display section, configured to display on the display unit a guidance route straightly connecting the forklift and the object if the judgement section judges that the obstacle is not present between the forklift and the object, or display on the display unit a guidance route connecting the forklift and the object in a manner of avoiding the obstacle if the judgement section judges that the obstacle is present between the forklift and the object,
wherein the judgement section forms a straight virtual route straightly connecting the forklift and the object and having a width corresponding to a width of the forklift, and judges that the obstacle is present between the forklift and the object if the entirety or a portion of the obstacle is present inside the straight virtual route having the width corresponding to the width of the forklift.

* * * * *